United States Patent [19]
Toyama

[11] Patent Number: 5,537,886
[45] Date of Patent: Jul. 23, 1996

[54] ENGINE STALL PREVENTION CONTROL METHOD

[75] Inventor: Makoto Toyama, Ishikawa, Japan

[73] Assignee: Kabushiki Kaisha Komatsu Seisakusho, Tokyo, Japan

[21] Appl. No.: 436,423

[22] PCT Filed: Nov. 24, 1993

[86] PCT No.: PCT/JP93/01719

§ 371 Date: May 24, 1995

§ 102(e) Date: May 24, 1995

[87] PCT Pub. No.: WO94/12813

PCT Pub. Date: Jun. 9, 1994

[30] Foreign Application Priority Data

Nov. 25, 1992 [JP] Japan ..................................... 4-336754

[51] Int. Cl.⁶ ....................................................... F16H 3/44
[52] U.S. Cl. ................................................. 74/336 R
[58] Field of Search ................................... 74/336 R, 337

[56] References Cited

U.S. PATENT DOCUMENTS

| | | | |
|---|---|---|---|
| 5,012,416 | 4/1991 | Bulgrien et al. | 74/336 R |
| 5,353,662 | 10/1994 | Vaughters | 74/336 R |
| 5,450,768 | 9/1995 | Bulgrien et al. | 74/336 R |

FOREIGN PATENT DOCUMENTS 62-177534  11/1987  Japan.
3-103659  4/1991  Japan.

*Primary Examiner*—Dirk Wright
*Attorney, Agent, or Firm*—Richards, Medlock & Andrews

[57] ABSTRACT

An engine stall prevention control method according to the present invention is a method for eliminating troublesome inching pedal operation, automatically preventing engine stall and relieving an operator from physical exhaustion. Therefore, in an engine stall prevention method for construction machines, each being provided with a transmission (10), which changes over forward or reverse movement by selectively engaging forward/reverse clutches (40, 32) located at a first stage from an input shaft (13) and changes over a speed stage by selectively engaging a plurality of transmission clutches (66, 68, 74) located at a second stage from the input shaft (13), and electronically controlled modulating valves (107–111) which supply a hydraulic pressure corresponding to electric signals from a transmission controller (131) to respective clutches; an engine stall prevention control range (P) and an engine stall prevention control cancel range (Q) are determined in accordance with an engine rotation rate and a differential value of the engine rotation rate and, when the engine rotation rate and a differential value of the engine rotation rate come into this control range (P), a hydraulic pressure of the engaging clutches is lowered and, when these values come into this cancel range (Q), the hydraulic pressure of the engaging clutches is raised.

16 Claims, 5 Drawing Sheets

ENGINE STALL PREVENTION CONTROL METHOD

FIELD OF THE INVENTION

The present invention relates to a method for preventing stalling of an engine (hereinafter referred to as "engine stall") of a construction machine or a traveling machine and, more particularly, an engine stall prevention method for construction machines and traveling machines respectively provided with a transmission having forward and reverse clutches, a plurality of speed-change clutches and a plurality of pressure control valves for controlling these clutches.

RELATED BACKGROUND ART

Conventional construction machines, such as bulldozers and wheel loaders, are generally provided with a planetary gear type transmission by which forward and rearward movements and speed steps are changed.

FIG. 4 shows an example of a planetary gear type transmission mounted on a construction machine. The planetary gear type transmission 10 is housed in a case 11 and comprises a forward/reverse changeover part 20 and a speed change part 50. In the forward/reverse changeover part 20, a sun gear 22 for reverse movement and a sun gear 24 for forward movement are fixed to an input shaft 13 connected to a drive source 12. A ring gear 26 is arranged around the sun gear 22 for reverse movement and a planetary gear 30 for reverse movement supported by a carrier 28 for reverse movement engages with this ring gear 26 and the sun gear 22 for reverse movement. This carrier 28 for reverse movement can be fixed to the case 11 or opened by a clutch 32 for reverse movement (hereafter referred to as "R clutch"). The ring gear 26 is connected to a carrier 36, which supports a planetary gear 34 for forward movement and two planetary gears of a speed changeover part 50. A ring gear 38 for forward movement, engaged with the planetary gear 34, can be fixed to the case 11 or opened by a clutch 40 for forward movement (hereafter referred to as "F clutch").

In the speed changeover part 50, a first speed sun gear 52, second speed sun gear 54 and third speed sun gear 56 are fixed to an output shaft 14. A second speed planetary gear 58 and a third speed planetary gear 60, which are engaged with the second sun gear 54 and the third speed sun gear 56, are supported by the carrier 36 which supports the planetary gear 34 for forward movement. In addition, the second speed planetary gear 58 and the third speed planetary gear 60 are engaged with a second speed ring gear 62 and a third speed ring gear 64 which are respectively arranged outside these planetary gears. These ring gears 62 and 64 can be fixed to the case 11 or opened by the second speed clutch 66 and the third speed clutch 68.

On the other hand, a carrier 70 connected to the second speed ring gear 62 supports the first speed planetary gear 72. This planetary gear 72 engages with the first speed sun gear 52 and is arranged in ambiance of the sun gear 52 and engaged with a first speed ring gear 76, which is fixed to the case 11 or opened by the first speed clutch 74.

Such planetary gear type transmission 10 guides a hydraulic pressure from a hydraulic circuit 80 to respective clutches 32, 40, 68, 66 and 74 for engagement as shown in FIG. 5 to carry out selection of forward or reverse movement and a speed stage.

A discharging flow passage 82 of a hydraulic pump 81 to be driven by an engine E is connected to a speed valve 84. The speed valve 84 is a four-position changeover valve, for the neutral N and the first, second and third speeds, and is connected to the first speed clutch 74 and an inching valve 85 at the first speed shift position, to the second speed clutch 66 and the inching valve 85 at the second speed shift position, and to the third speed clutch 68 and the inching valve 85 at the third speed shift position. The inching valve 85 is connected to a forward/reverse valve 86 through a flow passage. The forward/reverse valve 86 is a two-position changeover valve and is connected to the F clutch 40 at the forward movement position and to the R clutch 32 at the reverse movement position. The discharging flow passage 82 is branched and the branched flow passage 87 is connected to a modulating valve 88, which is connected by a flow passage to a transmission lubricator 89 and then to an oil reservoir 90.

For selecting the forward first speed, the forward/reverse valve 86 is set at the shift position for forward movement and the speed valve 84 to the first speed shift position by using respective operation levers. A pressure of hydraulic oil from the pump 81 is controlled by the modulating valve 88 and guided to the forward movement clutch 40 and the first speed clutch 74, while being gradually increased, to cause each of the forward movement clutch 40 and the first speed clutch 74 to be engaged. When the forward movement clutch 40 and the first speed clutch 74 are engaged, the forward movement ring gear 38 and the first speed ring gear 76 are fixed to the case 11 and the other clutches are released.

In the event that an engine stall of a construction machine, such as a bulldozer having a transmission as described above, may be caused due to an overload, the operator presses down the inching pedal to move the inching valve 85 in the arrow A direction to reduce the hydraulic pressure guided into the forward movement clutch 40 and to relieve the load on the engine E by slipping the F clutch 40, thus preventing the engine stall.

However, when the operator determines from the sound of the engine E that the engine speed is lowered and the engine stall may be caused by a variation of the vehicle speed, the operator presses down the inching pedal to lower the hydraulic pressure to slip the clutch, and to relieve the load on the engine E by accelerating the engine speed; and, when the revolving speed of the engine E is recovered, the operator stops pressing down of the inching pedal to perform engagement of the clutch. Accordingly, there is a problem in that such operation, wherein the inching pedal should be held down when the engine is overloaded and be released when the engine speed is restored, is often required, is troublesome, and makes the operator physically exhausted.

DISCLOSURE OF THE INVENTION

An object of the present invention is to provide an engine stall prevention method for eliminating such troublesome inching operation, as described above, for automatically preventing the engine stall, and for relieving the operator of the construction machine from physical exhaustion.

In an engine stall prevention method according to the present invention for construction machines, each being provided with a transmission, which has forward/reverse clutches located at a first stage from an input shaft and a plurality of transmission clutches located at the second stage from the input shaft, for causing the construction machine to move forwardly or reversely by selectively engaging the forward/reverse clutches and selecting a transmission stage by selectively engaging the transmission clutches, and a plurality of pressure control valves which are connected independently to respective clutches to apply a hydraulic pressure corresponding to electric signals to be entered from a transmission controller (hereafter referred to as "T/M controller"), an engine stall prevention control range (hereafter referred to as "control range") and an engine stall prevention control cancel range (hereafter referred to as "cancel range") are determined from the engine rotation rate and the differential value of the engine rotation rate, and the hydraulic pressure of the engaging clutch is lowered when the engine rotation rate and the differential value of the engine rotation rate come into this control range and is raised when the engine rotation rate and the differential value of the engine rotation rate come into this cancel range.

Specifically, the control range and the cancel range are stored in advance in the T/M controller. When the values, calculated with the engine rotation rate and the differential value of the engine rotation rate as parameters, remain in the control range, the T/M controller automatically generates a command for lowering the hydraulic pressure of the engaging clutch to an electronically controlled modulating valve (hereafter referred to as "ECMV valve) to slip this engaging clutch and, when the above-described values remain in the cancel range, the T/M controller automatically generates a command for raising the hydraulic pressure of the engaging clutch to the ECMV valve to stop slipping of the clutch, thereby relieving the operator from physical exhaustion.

BEST MODE FOR CARRYING OUT THE INVENTION

An embodiment according to the present invention is described referring to the accompanying drawings.

Figure 1:
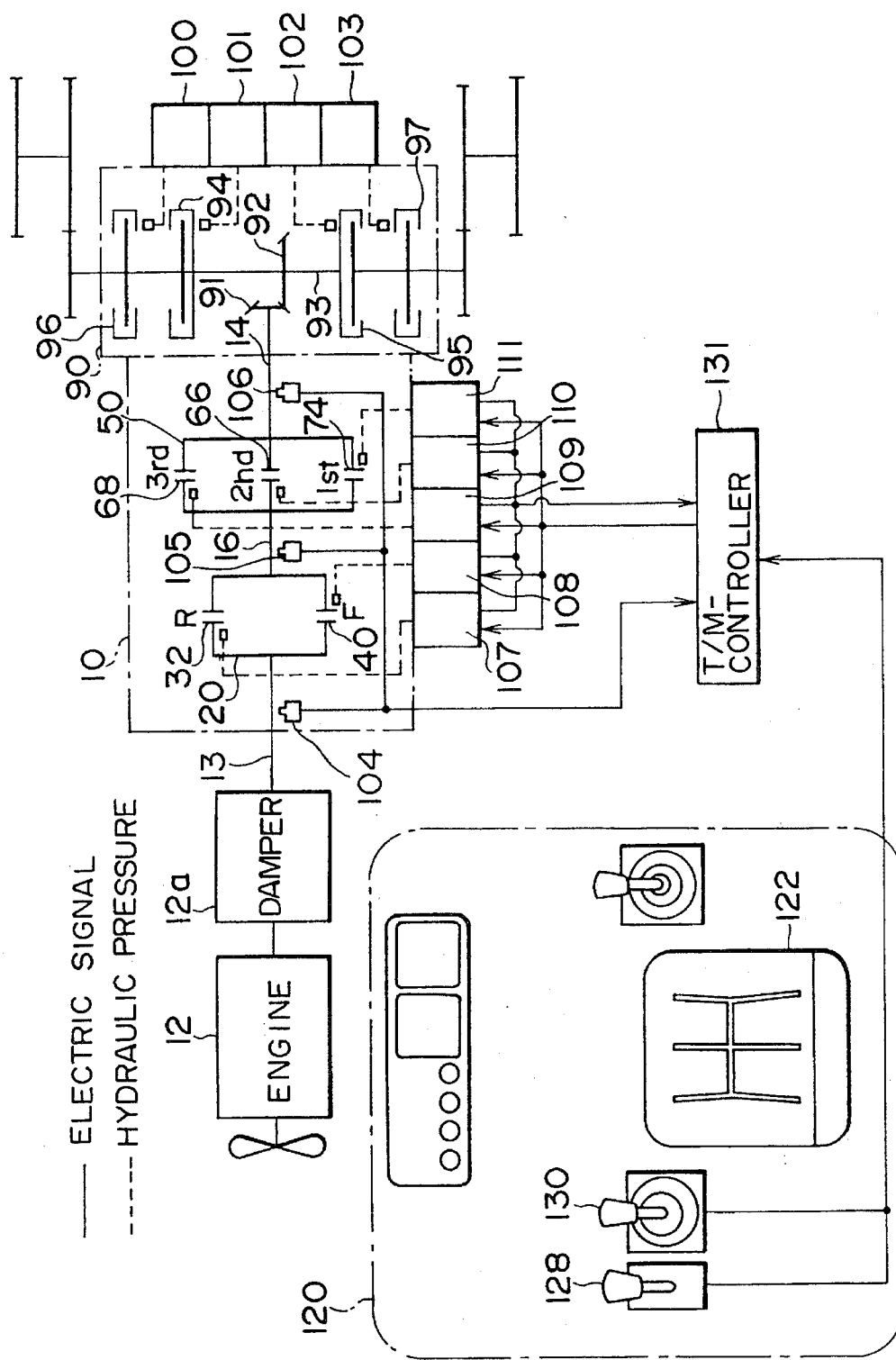
FIG. 1 is an illustration of a transmission which operates to carry out engine stall prevention control according to an embodiment of the present invention.

In FIG. 1, an input shaft 13 of a transmission 10 is connected to an engine 12 through a damper 12a. A pinion 91 of a clutch type steering unit 90 is fixed to an end of an output shaft 14. This pinion 91 engages with a gear 92 to transmit the rotation of the output shaft 14 to a shaft 93 which orthogonally intersects the output shaft 14. Steering clutches 94 and 95 are provided on both ends of the shaft 93 and steering brakes 96 and 97 are mounted on the output shafts of the steering clutches 94 and 95. The steering brakes 96 and 97 are actuated with a hydraulic pressure supplied from the ECMV valves 100 and 103, which serve as the brake drives, and the steering clutches 94 and 95 are actuated with the hydraulic pressure supplied through the ECMV valves 101 and 102, provided corresponding to the steering clutches 94 and 95.

On the other hand, rotation sensors 104, 105 and 106 are respectively provided on the input shaft 13, the intermediate shaft 16, and the output shaft 14 of the transmission 10 to permit detection of the rotation rates of the respective shafts. The reverse movement clutch 32, the forward movement clutch 40, the third speed clutch 68, the second speed clutch 66, and the first speed clutch 74 of the transmission 10 are actuated with the hydraulic pressure supplied from respective ECMV valves, which serve as the clutch drives correspondingly provided, to fix the corresponding carriers or the ring gears to the case 11 or to release them.

In a cab 120 of a bulldozer, a forward/reverse lever 130 for selecting forward or reverse travel of the bulldozer is provided at a front left-side of an operator seat 122 and a speed change lever 128 is provided at the left of the forward/reverse lever 130. The operation signals of the forward/reverse lever 130 and the speed change lever 128 are entered into the T/M controller 131. The T/M controller 131 generates electric signals for controlling the respective ECMV valves 107 to 111 which control the engaging forces of respective clutches of the transmission 10.

Figure 2:
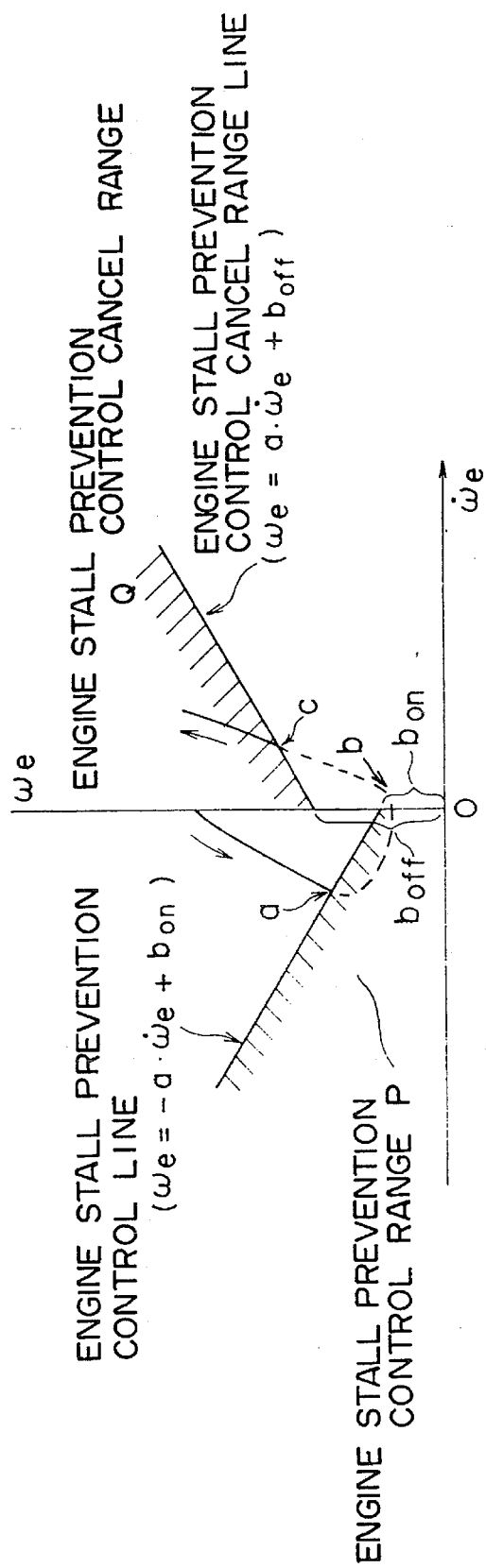
FIG. 2 is an illustration of the control range and the cancel range.

The T/M controller 131 receives the rotation rates of the input shaft 13, the intermediate shaft 16, and the output shaft 14, detected by the rotation sensors 104 to 106, and determines the control range P and the cancel range Q according to the rotation rate $\omega e$ and a differential value $\dot{\omega}$ of the rotation rate $\omega e$ of the input shaft 13 as parameters. These parameters are stored in the memory. For the control range P and the cancel range Q, an engine stall control line (hereafter referred to as "control line") and an engine stall prevention control cancel line (hereafter referred to as "cancel line") are determined by plotting the rotation rate $\omega e$ on the vertical axis and the differential value $\dot{\omega} e$ of the rotation rate $\omega e$ on the horizontal axis, as shown in FIG. 2. In the embodiment illustrated in FIG. 2, the engine stall prevention control cancel range line is defined as: $\omega e = a \cdot \dot{\omega} e + b_{off}$, while the engine stall control line is defined as: $\omega e = -a \cdot \dot{\omega} e + b_{on}$. Engine stall prevention control is carried out by defining a range below the control line as the control range P, that is, a range where the rotation rate of the engine is lowered and a minus value of acceleration of the engine becomes large. Engine stall prevention control is stopped by defining a range above the cancel line as the cancel range Q, that is, a range where the rotation rate of the engine is raised and the acceleration of the engine is increased.

Figure 3:
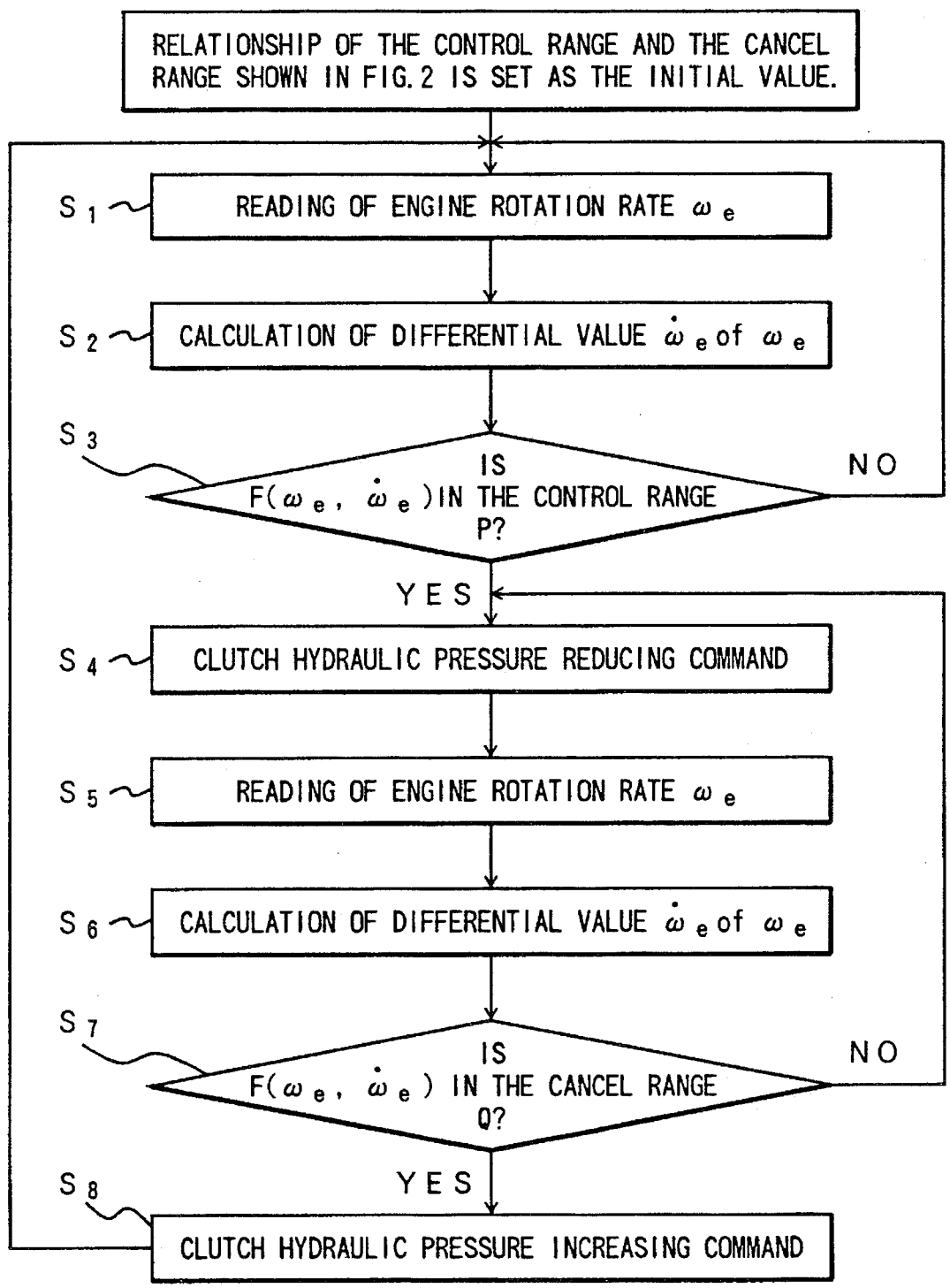
FIG. 3 is a flow chart for executing engine stall prevention control.
Figure 4:
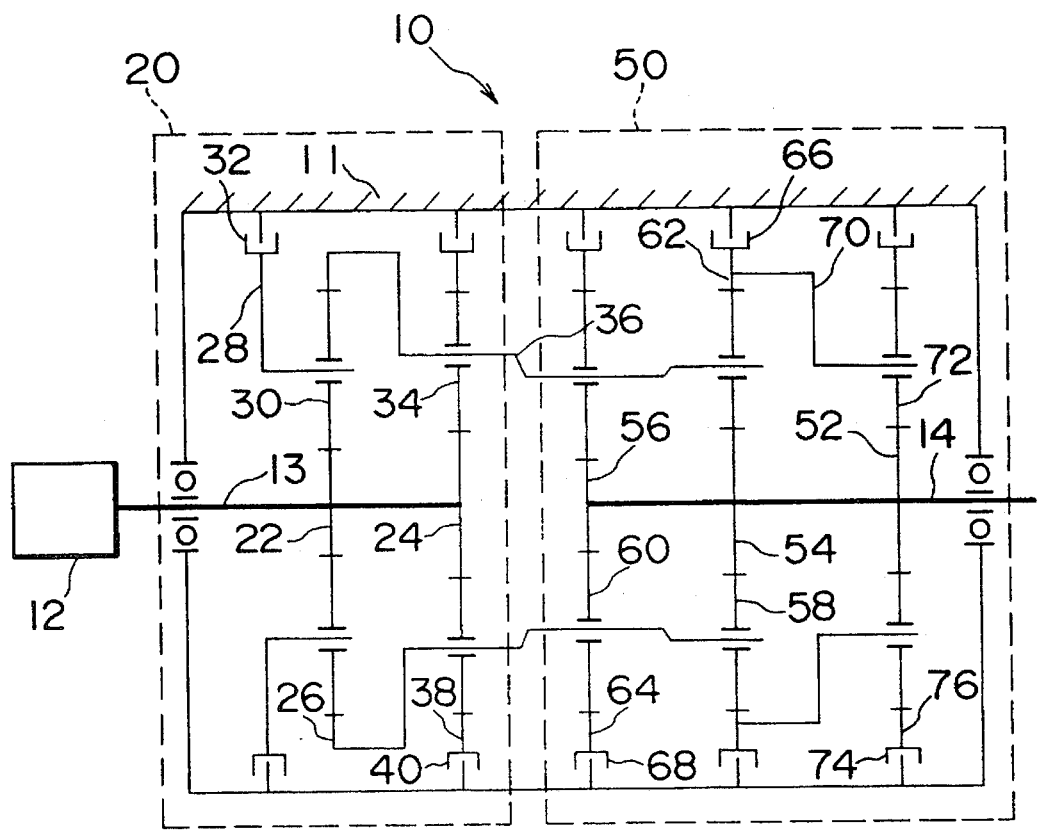
FIG. 4 is an illustration of a conventional planetary gear type transmission system mounted on a construction machine.
Figure 5:
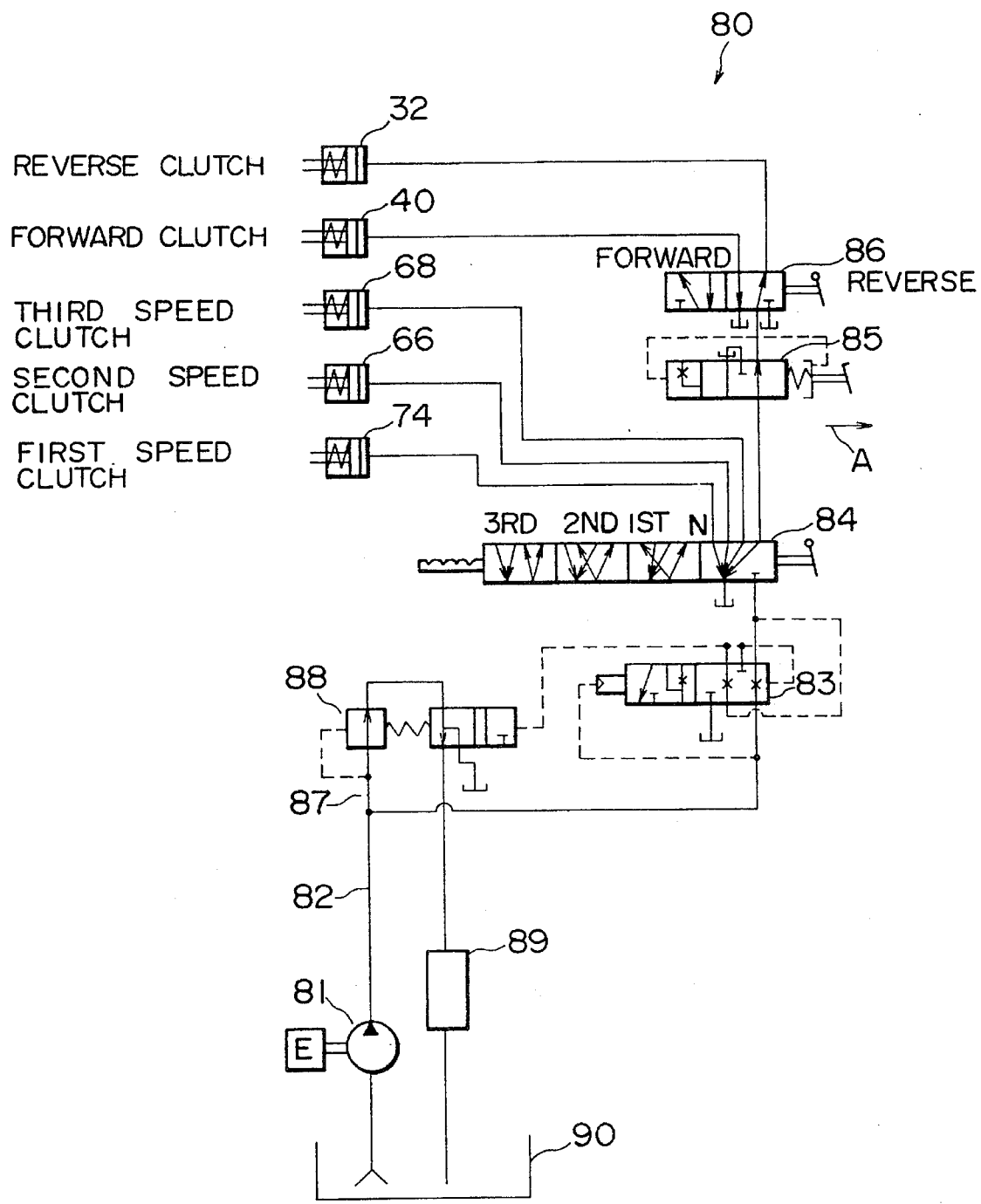
FIG. 5 is a hydraulic circuit diagram for engagement of forward/reverse clutches and engagement of speed stage changeover clutches.

An example of the engine stall prevention control method is described according to the flow chart shown in FIG. 3.

In step S1, the rotation rate me of the input shaft 13, measured by the rotation sensor 104, is read. In step S2, the differential value $\dot{\omega} e$ of the rotation rate me of the input shaft 13 is calculated. In step S3, the control range is determined as a parameter according to the rotation rate $\omega e$ and the differential value $\dot{\omega} e$, that is, $F(\omega e, \dot{\omega} e)$. If the parameter is out of the control range (NO in step S3), the operation returns to step S1. If the parameter remains in the control range P (YES in step S3), $F(\omega e, \dot{\omega} e)$ in FIG. 2 stays at a position below the point a, the value of the engine rotation rate $\omega e$ becomes small, the minus value of acceleration $\dot{\omega} e$ becomes large, the load on the engine is excessively large, and therefore the operation advances to step S4. In step S4, an electric signal command for reducing the clutch hydraulic pressure of the forward clutch 40 according to hydraulic modulation is generated from the T/M controller to the ECMV valve 108. If the clutch hydraulic pressure is reduced according to the hydraulic modulation, the clutch is slipped for disengagement, the load on the engine is relieved to reach the point b from deceleration to acceleration in FIG.

2. Though the load of the engine further approaches point c, the forward clutch 40 is maintained in a slipping condition. Also in step S5, the rotation rate ωe of the input shaft 13, measured by the rotation sensor 104, is read and, in step S6, the differential value ω̇e of the rotation rate ωe of the input shaft 13 is calculated. In step S7, the cancel range Q is determined according to F(ωe, ω̇e) and, if the value of parameter is out of the cancel range Q (NO in step S7), the operation returns to step S4. If the parameter remains in the cancel range Q (YES in step S7), the operation advances to step S8 when the rotation rate ωe and the acceleration ω̇e of the engine increase across the point c in FIG. 2. In step S8, a clutch hydraulic pressure increase command is generated from the T/M controller to the ECMV valve 108.

INDUSTRIAL APPLICABILITY

The present invention is useful as an engine stop prevention control method for construction machines capable of eliminating troublesome operation of the inching pedal, of automatically preventing engine stall of the construction machine, and of relieving the operator from physical exhaustion.

What is claimed is:

1. A method of preventing engine stall in a machine provided with a transmission having a transmission controller, forward/reverse clutches and a plurality of transmission clutches for causing the machine to move forwardly or reversely by the selective engagement of the forward/reverse clutches and at a speed stage determined by the selective engagement of said transmission clutches, and a plurality of pressure control valves, each pressure control valve being independently connected to a respective one of the clutches to apply a hydraulic pressure to the respective clutch corresponding to a signal received from said transmission controller, the method comprising the steps of:

establishing an engine stall prevention control range and an engine stall prevention control cancel range as a function of engine rotation rate and a differential value of the engine rotation rate;

detect the actual engine rotation rate;

determining a differential value of the actual engine rotation rate;

determining whether the function of the actual rotation rate and the differential value of the actual rotation rate is within said engine stall prevention control range;

lowering the hydraulic pressure of the forward/reverse engaged clutch when the function of the engine rotation rate and the differential value of the engine rotation rate come into said engine stall prevention control range;

determining whether the function of the actual rotation rate and the differential value of the actual rotation rate is within said engine stall prevention control cancel range; and raising the hydraulic pressure of the forward/reverse engaged clutch when the function of the engine rotation rate and the differential value of the engine rotation rate come into said engine stall prevention control cancel range.

2. A method in accordance with claim 1 wherein each of said engine stall prevention control range and said engine stall prevention control cancel range is stored in advance in said transmission controller.

3. A method in accordance with claim 1, wherein when the value of the function, of the actual rotation rate and the differential value of the actual rotation rate, remains in the engine stall prevention control range, said transmission controller automatically generates a command to an electronically controlled modulating valve to lower the hydraulic pressure of the forward/reverse engaged clutch to slip the forward/reverse engaged clutch; and when the value of the function, of the actual rotation rate and the differential value of the actual rotation rate, remains in the engine stall prevention control cancel range, the transmission controller automatically generates a command to an electronically controlled modulating valve to raise the hydraulic pressure of the forward/reverse engaged clutch to stop the slipping of the forward/reverse engaged clutch.

4. A method in accordance with claim 2, wherein the engine stall prevention control range is determined as being below an engine stall control line which is plottable with the rotation rate ωe as the vertical axis and the differential value ω̇e as the horizontal axis.

5. A method in accordance with claim 4, wherein the engine stall control line is defined as: $\omega e = -a \cdot \dot{\omega} e + b_{on}$.

6. A method in accordance with claim 4, wherein the engine stall prevention control cancel range is determined as being above an engine stall prevention control cancel range line which is plottable with the rotation rate ωe as the vertical axis and the differential value ω̇e as the horizontal axis.

7. A method in accordance with claim 6, wherein the engine stall prevention control cancel range line is defined as:

$$\omega e = a \cdot \dot{\omega} e + b_{off}.$$

8. A method in accordance with claim 7, wherein the engine stall control line is defined as: $\omega e = -a \cdot \dot{\omega} e + b_{on}$.

9. A method in accordance with claim 3, wherein the engine stall prevention control range is determined as being below an engine stall control line which is plottable with the rotation rate ωe as the vertical axis and the differential value ω̇e as the horizontal axis.

10. A method in accordance with claim 9, wherein the engine stall control line is defined as: $\omega e = -a \cdot \dot{\omega} e + b_{on}$.

11. A method in accordance with claim 9, wherein the engine stall prevention control cancel range is determined as being above an engine stall prevention control cancel range line which is plottable with the rotation rate ωe as the vertical axis and the differential value ω̇e as the horizontal axis.

12. A method in accordance with claim 11, wherein the engine stall prevention control cancel range line is defined as:

$$\omega e = a \cdot \dot{\omega} e + b_{off}.$$

13. A method in accordance with claim 12, wherein the engine stall control line is defined as: $\omega e = -a \cdot \dot{\omega} e + b_{on}$.

14. A method in accordance with claim 1, wherein the engine stall prevention control range is determined as being a range where the rotation rate of the engine is lowered and a minus value of the acceleration of the engine is increased.

15. A method in accordance with claim 14, wherein the engine stall prevention control cancel range is determined as being a range where the rotation rate of the engine is increased and the acceleration of the engine is increased.

16. A method in accordance with claim 1, wherein the engine stall prevention control cancel range is determined as being a range where the rotation rate of the engine is increased and the acceleration of the engine is increased.

* * * * *